United States Patent
Ichigaya

(10) Patent No.: US 10,205,199 B2
(45) Date of Patent: Feb. 12, 2019

(54) PORTABLE RECHARGEABLE POWER SUPPLY DEVICE

(71) Applicant: SFT LABORATORY CO., LTD., Itabashi-ku, Tokyo (JP)

(72) Inventor: Hiroshi Ichigaya, Tokyo (JP)

(73) Assignee: SFT LABORATORY CO., LTD., Tokyo (JP)

( * ) Notice: Subject to any disclaimer, the term of this patent is extended or adjusted under 35 U.S.C. 154(b) by 33 days.

(21) Appl. No.: 15/102,516

(22) PCT Filed: Dec. 20, 2013

(86) PCT No.: PCT/JP2013/084326
§ 371 (c)(1),
(2) Date: Jun. 7, 2016

(87) PCT Pub. No.: WO2015/092927
PCT Pub. Date: Jun. 25, 2015

(65) Prior Publication Data
US 2016/0359205 A1 Dec. 8, 2016

(51) Int. Cl.
*H02J 7/00* (2006.01)
*H01M 10/46* (2006.01)
(Continued)

(52) U.S. Cl.
CPC .......... *H01M 10/46* (2013.01); *H01M 2/105* (2013.01); *H01M 2/1005* (2013.01);
(Continued)

(58) Field of Classification Search
CPC .... H01M 10/46; H01M 2/1005; H01M 2/105; H01M 2/1055; H01M 2/1066;
(Continued)

(56) References Cited

U.S. PATENT DOCUMENTS 6,184,658 B1   2/2001   Mori et al.
6,461,764 B1   10/2002  Nakamura
(Continued)

FOREIGN PATENT DOCUMENTS

CN   1485946 A   3/2004
JP   49036474 U  3/1974
(Continued)

OTHER PUBLICATIONS

International Preliminary Report on Patentability (IPRP) including Written Opinion (and English translation thereof) dated Jun. 21, 2016, issued in counterpart International Application No. PCT/JP2013/084326.
(Continued)

*Primary Examiner* — Zixuan Zhou
(74) *Attorney, Agent, or Firm* — Holtz, Holtz & Volek PC

(57) ABSTRACT

Provided is a portable rechargeable power supply device such that major accidents such as from overcharging due to a hazard prevention means being damaged by rain water, or the like can be prevented from occurring. This portable rechargeable power supply device comprises a lithium-ion battery (11), an assembled circuit board (20), and a case (40). Two terminals (31a, 31b), a hazard prevention circuit unit (26), and the like, are provided on the assembled circuit board (20). A terminal housing case portion (416) of the case (40) houses a first portion of the assembled circuit board (20), which is provided with the two terminals (31a, 31b). A main body housing case portion (417) of the case (40) houses the lithium-ion battery (11), and a second portion of the assembled circuit board (20), which is provided with the hazard prevention circuit unit (26), and the like. The terminal housing case portion (416) and the main body housing case portion (417) are separated by a divider plate (414) and a shelving plate (415a). A gap between the divider plate
(Continued)

(414) and the assembled circuit board (20) is closed by a gasket member (61).

16 Claims, 12 Drawing Sheets

(51) Int. Cl.
| | | |
|---|---|---|
| *H01M 2/10* | (2006.01) | |
| *H01M 2/34* | (2006.01) | |
| *H01M 10/42* | (2006.01) | |
| *H01M 10/0525* | (2010.01) | |

(52) U.S. Cl.
CPC ....... *H01M 2/1055* (2013.01); *H01M 2/1066* (2013.01); *H01M 2/34* (2013.01); *H01M 10/0525* (2013.01); *H01M 10/425* (2013.01); *H01M 10/4235* (2013.01); *H02J 7/0021* (2013.01); *H02J 7/0024* (2013.01); *H02J 7/0026* (2013.01); *H02J 7/0029* (2013.01); *H02J 7/0031* (2013.01); *H02J 7/0042* (2013.01); *H02J 7/0047* (2013.01); *H01M 2200/00* (2013.01); *H01M 2220/30* (2013.01); *H02J 2007/005* (2013.01); *H02J 2007/0037* (2013.01)

(58) Field of Classification Search
CPC .... H01M 2/34; H01M 10/0525; H02J 7/0021; H02J 7/0024
USPC .......................................... 320/134
See application file for complete search history.

(56) References Cited

U.S. PATENT DOCUMENTS

| | | |
|---|---|---|
| 7,088,075 B2 | 8/2006 | Baba et al. |
| 9,006,932 B2 | 4/2015 | Shimura et al. |
| 2003/0151868 A1* | 8/2003 | Inae ....................... H01H 57/00 361/88 |
| 2004/0095093 A1* | 5/2004 | Baba ..................... H01M 2/105 320/112 |
| 2007/0050878 A1 | 3/2007 | Ichigaya |
| 2011/0266875 A1 | 11/2011 | Shimura et al. |
| 2012/0313562 A1* | 12/2012 | Murao .................. B60L 3/0046 318/139 |

FOREIGN PATENT DOCUMENTS

| | | |
|---|---|---|
| JP | 52134792 U | 10/1977 |
| JP | 54144224 U | 10/1979 |
| JP | 11185719 A | 7/1999 |
| JP | 11283593 A | 10/1999 |
| JP | 2000100402 A | 4/2000 |
| JP | 2004079416 A | 3/2004 |
| JP | 2005054299 A | 3/2005 |
| JP | 2005116224 A | 4/2005 |
| JP | 3170790 U | 9/2011 |
| JP | 2011181415 A | 9/2011 |
| WO | 2010084835 A1 | 7/2010 |

OTHER PUBLICATIONS

International Search Report (ISR) dated Mar. 11, 2014 issued in International Application No. PCT/JP2013/084326.
Japanese Office Action dated Nov. 14, 2017 issued in counterpart Japanese Application No. 2014-514968.
Chinese Office Action dated Aug. 3, 2018 (and English translation thereof) issued in counterpart Chinese Application No. 201380081473.2.

* cited by examiner

PORTABLE RECHARGEABLE POWER SUPPLY DEVICE

TECHNICAL FIELD

The present invention relates to a portable rechargeable power supply device using a lithium-ion battery (cell), which is used as a power supply of air-conditioned cloths, heated cloths and the like.

BACKGROUND ART

In recent years, air-conditioned cloths, which ventilate air to evaporate sweat produced by the human body, and heated cloths, which heat the human body by a plate heater, have been put into practice. Detailed description of the principle and structure of an air-conditioned cloth can be found in Patent Document 1 for example.

Portable rechargeable power supply devices using a lithium-ion battery have been used as a power supply of such air-conditioned cloths and heated cloths. Specifically, a portable rechargeable power supply device that is used as the power supply of an air-conditioned cloth for a worker includes a lithium-ion battery and a DC converter for controlling the output power. For example, the lithium-ion battery has a voltage of 7.4 V and a capacity of 4000 mAh, which is composed of four lithium-ion single cells connected in series-parallel each having a voltage of 3.7V and a capacity of 2000 mAh. The DC converter converts the output voltage of the lithium-ion battery to any one of, for example, 4 V, 5 V, 6 V and 7.4V. By using the portable rechargeable power supply device, the user can select a desired voltage according to the working environment.

PRIOR ART DOCUMENT

Patent Document

Patent Document 1: JP 2005-54299A

SUMMARY OF INVENTION

Problems to be Solved by Invention

It is required that portable rechargeable power supply devices that are used as a power supply of air-conditioned cloths and the like have such a large capacity as described above. Furthermore, high safety is also required for such power supply devices since they are worn during use. In particular, lithium-ion batteries are bound to cause serious problems such as explosion and fire when they are overcharged to a certain level or more. To cope with the problem, such power supply devices include a hazard prevention circuit (hazard prevention section) for preventing such problems, in particular an overcharge prevention circuit. Therefore, it is the most important for the safety of portable rechargeable power supply devices that their overcharge prevention circuit functions properly.

Since air-conditioned cloths and the like are also used outdoors, rain water, etc. may leak into portable rechargeable power supply device. When the leaked rain water, etc. breaks the overcharge prevention circuit, the probability of occurrence of a serious incident due to overcharge rises to an extremely high level. Portable rechargeable power supply devices for air-conditioned cloths are typically worn on the body such that they are housed in a leather case with a belt clip and the leather case is attached to a belt by means of the belt clip as illustrated in FIG. 2. Therefore, when it rains, it is inevitable that such portable rechargeable power supply devices get wet by the rain. While it is possible to form the leather case in a specific shape so that rain water does not leak in the leather case, such cases are costly and also very inconvenient for use.

Portable rechargeable power supply devices have at least one terminal in which a plug of a cable for supplying electric power to an air-conditioned cloth or a plug of a charger is inserted. While an air-conditioned cloth or the like is used, a plug is inserted and removed almost everyday for charging the lithium-ion battery and for supplying electric power to the air-conditioned cloth. Since a plug is frequently inserted and removed in/out of a jack terminal, it is required to use a robust and easy-to-use universal jack for portable rechargeable power supply devices. However, since a universal jack is normally attached to a circuit board, it is inevitable in portable rechargeable power supply devices that rain water, etc. leak in through an opening that is formed at a position corresponding to the universal jack. Even when the opening itself is eliminated by using a panel mount jack so that leakage of rain water, etc. through the opening is prevented, the jack itself is open to the outside, and there is still a gap through which rain water, etc. can leak in. Therefore, it is impossible to completely prevent leakage of rain water, etc. Another technique is an electromagnetic induction method which enables transferring electric power without using a jack or the like. However, the method is not practical at all for power supply devices of air-conditioned cloths and the like for various reasons.

The present invention has been made in view of the above-described circumstances, and an object thereof is to provide a portable rechargeable power supply device that can prevent its hazard prevention section from being damaged by rain water, etc. and thereby prevent a serious incident due to overcharge or the like.

Means for Solving Problems

In order to achieve the object, a portable rechargeable power supply device according to the present invention includes:

at least one lithium-ion battery;

at least one terminal which is exposed to an outside and receives and supplies electric power from and to the outside;

a hazard prevention section comprising an overcharge prevention section which prevents an overcharge of the at least one lithium-ion battery at least while charging;

a control section which controls electric power taken out of the at least one lithium-ion battery; and a case in which the at least one lithium-ion battery, the at least one terminal, the hazard prevention section and the control section are housed, the case comprising: a terminal housing case portion in which at least the at least one terminal connectable from the outside and a first electrically conducting sections of wiring members are housed; a main body housing case portion in which at least the at least one lithium-ion battery, the hazard prevention section and second electrically conducting sections of wiring members are housed; and a dividing section which partitions the case into the terminal housing case portion and the main body housing case portion, wherein the first electrically conducting sections and the second electrically conducting sections are electrically connected to each other via a connecting portion disposed in a predetermined portion of the dividing section, and the dividing section prevents leaked water in the terminal housing case portion which has leaked in through the at least one terminal or a surrounding part of the terminal from further leaking into the main body housing case portion through the predetermined portion of the dividing section.

In the portable rechargeable power supply device of the present invention, since the device has the above configuration, the dividing section partitions the case into the terminal housing case portion, in which at least the at least one terminal and the first electrically conducting sections are housed, and the main body housing case portion, in which at least the at least one lithium-ion battery, the hazard prevention section and the second electrically conducting sections are housed. Further, the first electrically conducting sections and the second electrically conducting sections are electrically connected to each other via the connecting portion disposed in a predetermined portion in the dividing section. The dividing section prevents leaked water in the terminal housing case portion that has leaked in through the at least one terminal and the surrounding part thereof from further leaking into the main body housing case portion through the predetermined portion of the dividing section. Even when rain water, etc. leaks into the terminal housing case portion through the at least one terminal or the surrounding part thereof, further leakage of the leaked rain water, etc. into the main body housing case portion can be prevented. Therefore, the hazard prevention section housed in the main body housing case portion can be prevented from being damaged by rain water, etc., and a serious incident due to overcharge and the like can be prevented.

The portable rechargeable power supply device may be configured such that only the at least one lithium-ion battery, the hazard prevention section and the second electrically conducting sections are housed in the main body housing case portion.

Advantageous Effects of Invention

In the portable rechargeable power supply device of the present invention, the dividing section partitions the case into the terminal housing case portion, in which at least the at least one terminal and the first electrically conducting sections are housed, and the main body housing case portion, in which at least the at least one lithium-ion battery, the hazard prevention section and the second electrically conducting sections are housed. Further, the first electrically conducting sections and the second electrically conducting sections are electrically connected to each other via the connecting portion disposed in a predetermined portion in the dividing section. The dividing section prevents leaked water in the terminal housing case portion that has leaked in through the at least one terminal and the surrounding part thereof from further leaking into the main body housing case portion through the predetermined portion of the dividing section. Even when rain water, etc. leaks into the terminal housing case portion through the at least one terminal or the surrounding part thereof, further leakage of the leaked rain water, etc. into the main body housing case portion can be prevented. Therefore, the hazard prevention section housed in the main body housing case portion can be prevented from being damaged by rain water, etc., and a serious incident due to overcharge and the like can be prevented.

EMBODIMENTS FOR CARRYING OUT INVENTION

Figure 1:
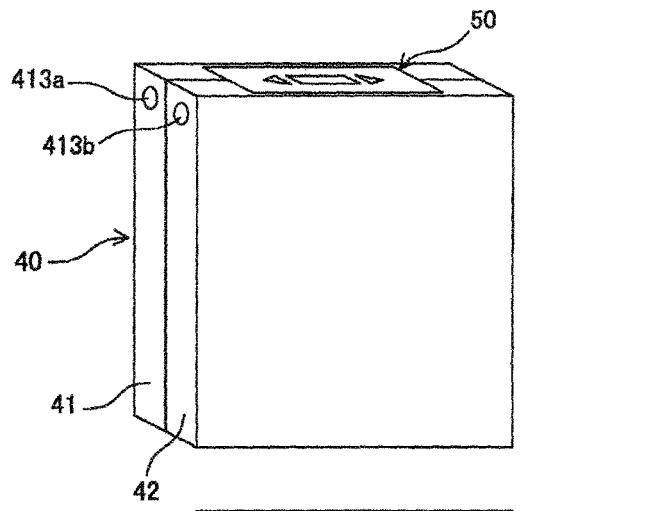
FIG. 1(a) is a schematic perspective view of a portable rechargeable power supply device according to a first embodiment of the present invention.
FIG. 1(b) is a schematic front view of the portable rechargeable power supply device.
FIG. 1(c) is a schematic side view of the portable rechargeable power supply device.
FIG. 1(d) is a schematic plan view of the portable rechargeable power supply device.
Figure 1:
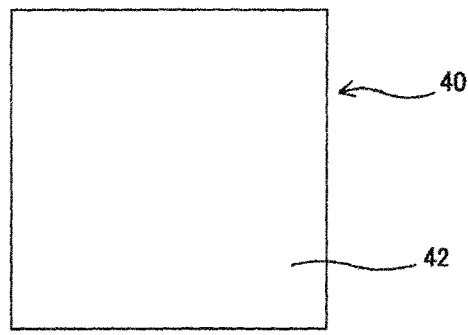
Figure 1:
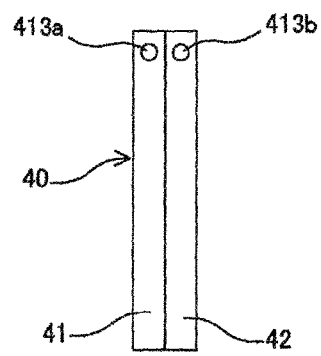
Figure 1:
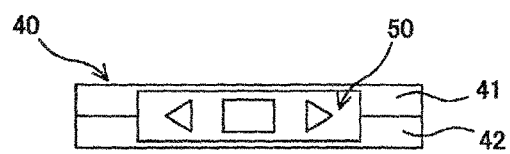

Hereinafter, embodiments for carrying out the present invention will be described referring to the drawings.

First Embodiment

Figure 2:
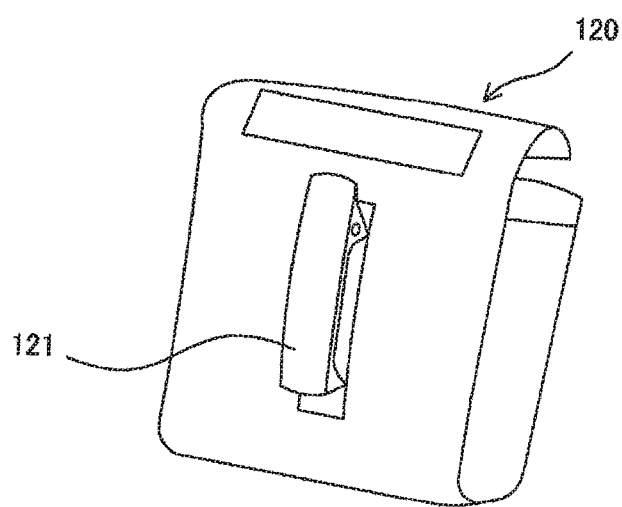
FIG. 2 is a schematic perspective view of a leather case with a belt clip for housing the portable rechargeable power supply device according to the first embodiment.

First, a first embodiment of the present invention will be described referring to the drawings. FIG. 1(a) is a schematic perspective view of a portable rechargeable power supply device according to the first embodiment of the present invention, FIG. 1(b) is a schematic front view of the portable rechargeable power supply device, FIG. 1(c) is a schematic side view of the portable rechargeable power supply device, and FIG. 1(d) is a schematic plan view of the portable rechargeable power supply device. FIG. 2 is a schematic perspective view of a leather case with a belt clip for housing the portable rechargeable power supply device according to the first embodiment. FIG. 3(a) is a schematic perspective view of a battery unit of the portable rechargeable power supply device according to the first embodiment, and FIG. 3(b) is a schematic front view of the battery unit.

Figure 3:
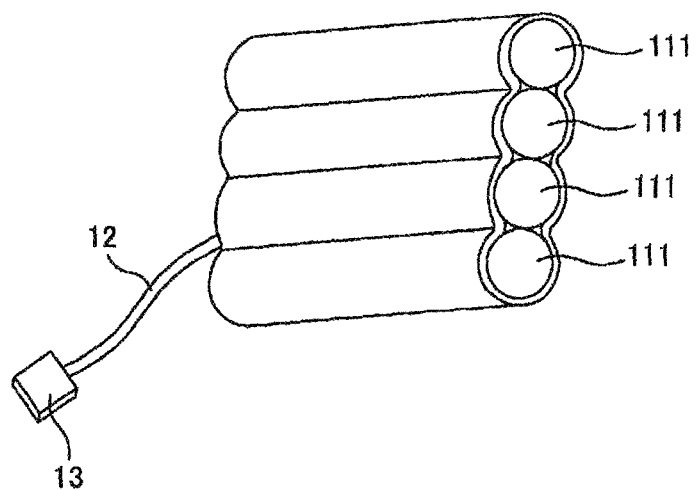
FIG. 3(a) is a schematic perspective view of a battery unit of the portable rechargeable power supply device according to the first embodiment.
FIG. 3(b) is a schematic front view of the battery unit.
Figure 3:
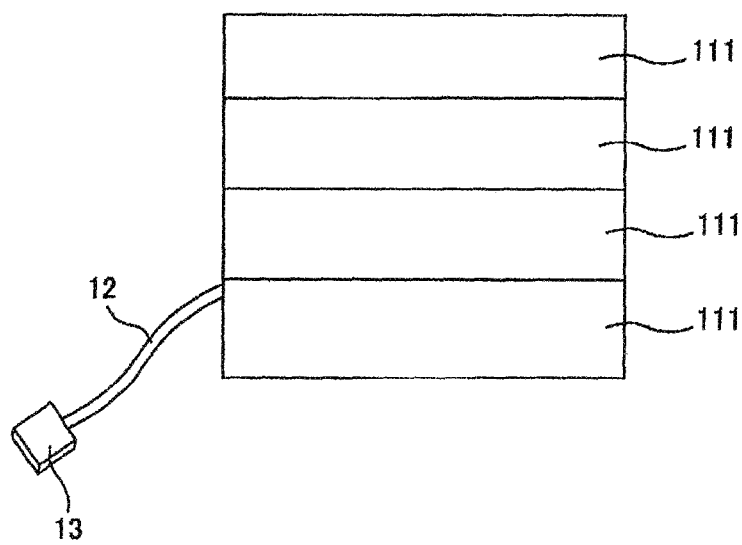

The portable rechargeable power supply device of the first embodiment is used as a power supply of an air-conditioned cloth, a heated cloth or the like for example. As illustrated in FIG. 1 and FIG. 3, the portable rechargeable power supply device includes a battery unit 11, an assembled circuit board (not shown), a plastic case 40 and a sealing sticker 50. The battery unit 11 includes lithium-ion single cells 111. On the assembled circuit board, a variety of circuit elements required for the portable rechargeable power supply device are mounted. The battery unit 11 and the assembled circuit board are housed in the case 40 (see FIG. 7). The portable rechargeable power supply device has an approximately cuboid outer shape. The following description illustrates an example in which the portable rechargeable power supply device of the first embodiment is used as a power supply of an air-conditioned cloth.

When the portable rechargeable power supply device is used as a power supply of an air-conditioned cloth, the portable rechargeable power supply device is required to be worn on the human body considering that a man wearing the air-conditioned cloth moves around during work. For this reason, the portable rechargeable power supply device is housed in a leather case 120 of FIG. 2. The leather case 120 is attached to a belt by means of a belt clip 121 of the leather case 120 so that the portable rechargeable power supply device is worn on the human body. In this condition, the portable rechargeable power supply device is connected to the air-conditioned cloth via a cable attached to the air-conditioned cloth, and the electric power stored in the lithium-ion single cells is supplied to the air-conditioned cloth. The portable rechargeable power supply device includes a terminal that is open to the outside, and the cable of the air-conditioned cloth is connected to the terminal.

As illustrated in FIG. 3, the battery unit 11 includes four lithium-ion single cells 111, 111, 111, 111, a small substrate (not shown), a cable 12 attached to the substrate and a lock terminal 13. The lithium-ion battery is an assembled battery that is composed of the connected four lithium-ion single cells 111, 111, 111, 111. The small substrate is provided for making the assembled battery from the four lithium-ion single cells 111, 111, 111, 111. Such small substrates are known in the art, and the description thereof is omitted. The cable 12, which is led from the small substrate to the outside, is provided for connecting the lithium-ion battery to the assembled circuit board via the lock terminal 13. In the following description, the battery unit 11, which is composed of the four lithium-ion single cells 111, 111, 111, 111, the small substrate, the cable 12 and the lock terminal 13, is referred to as the lithium-ion battery 11.

Next, the assembled circuit board will be described. FIG. 4(a) is a schematic front view of the assembled circuit board of the portable rechargeable power supply device according to the first embodiment, and FIG. 4(b) is a schematic side view of the assembled circuit board.

Figure 4:
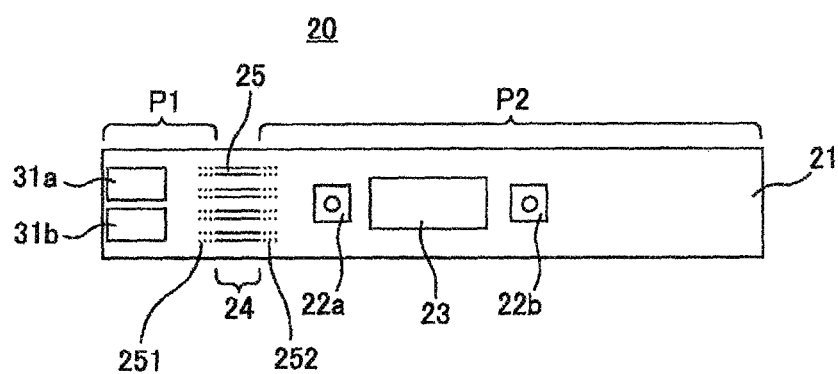
FIG. 4(a) is a schematic front view of an assembled circuit board of the portable rechargeable power supply device according to the first embodiment.
FIG. 4(b) is a schematic side view of the assembled circuit board.
Figure 4:
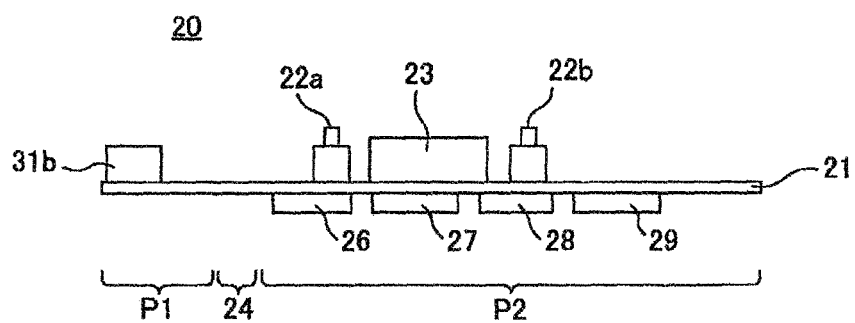

As illustrated in FIG. 4, various circuit elements are mounted on the assembled circuit board 20. Specifically, the assembled circuit board 20, which is formed in a long rectangular shape, includes a substrate 21 with a printed pattern, and two terminals 31, 31b, two operation sections 22a, 22b, a display section 23, a hazard prevention circuit unit (hazard prevention section) 26, a control circuit unit (control section) 27, a display control circuit unit (display control section) 28 and a remaining circuit unit 29 that are mounted on the substrate 21. The two terminals 31a, 31b are attached to one end of the upper face of the substrate 21. The terminals 31a, 31b is provided for receiving and supplying electric power from and to the outside, i.e. for holding an inserted plug of a charger for charging the lithium-ion battery 11 or for holding an inserted plug that is connected to the end of a cable of an air-conditioned cloth. Particularly in the first embodiment, the terminals 31a, 31b function as input/output common terminals that are used for charging the lithium-ion battery 11 and supplying (discharging) electric power from the lithium-ion battery 11 externally. In practice, air-conditioned cloths require charging and discharging (usage) repeatedly on a daily basis due to the nature of such products, and the terminals are repeatedly subjected to a stress during use due to a body movement. Therefore, the probability of the terminals being damaged is high. By using both of the two terminals 31a, 31b as input/output common terminals, even when one terminal fails, the other working terminal can be used instead. Therefore, the failure rate of the portable rechargeable power supply device of the first embodiment can be decreased to a great extent. Further, the two terminals 31a, 31b are arranged closely to each other on the substrate 21 so that plugs of external devices cannot be inserted in both of the two terminals 31a, 31b at the same time. This can prevent an improper use of the portable rechargeable power supply device of the first embodiment, such as using an air-conditioned cloth while charging the lithium-ion battery 11.

The operation sections 22a, 22b and the display section 23 are disposed on the upper face of the substrate 21 away from the terminals 31a, 31b. The operation sections 22a, 22b are used for inputting a command to the control circuit unit 27. Specifically, by operating the operation sections 22a, 22b, the user can send operation signals to the control circuit unit 27, such as an operation of turning on/off the power and an operation of changing the output voltage of the lithium-ion battery 11. The operation sections 22a, 22b are constituted by small push switches. The display section 23 displays information on the battery level of the lithium-ion battery 11 and the like.

The hazard prevention circuit unit 26, the control circuit unit 27, the display control circuit unit 28 and the remaining circuit unit 29 are formed on the back face of the substrate 21 away from the terminals 31a, 31b. The hazard prevention circuit unit 26 includes an overcharge prevention circuit (overcharge prevention section) that prevents the lithium-ion battery 11 from being overcharged while charging and an output current limiting circuit that limits the electric power taken out of the lithium-ion battery 11 to less than a predetermined level. The control circuit unit 27 performs a variety of processing that is required for controlling the portable rechargeable power supply device, such as a control of on/off of the power and a control of the electric power taken out of the lithium-ion battery 11. The display control circuit unit 28 controls the display section 23 based on a signal from the control circuit unit 27. The remaining circuit unit 29 has a variety of functions required for the portable rechargeable power supply device other than the functions of the above-described circuit units 26 to 28. The detailed description of the remaining circuit unit 29 is omitted here.

In the first embodiment, the assembled circuit board 20 has three portions: a first portion P1 in which the two terminals 31a, 31b are mounted and first electrically conducting sections (not shown) as wiring members is formed; a second portion P2 in which the operation sections 22a, 22b, the display section 23, the hazard prevention circuit unit 26, the control circuit unit 27, the display control circuit unit 28 and the remaining circuit unit 29 are disposed, and second electrically conducting sections (not shown) as wiring members is formed; and a portion (divider portion) 24 between the first portion P1 and the second portion P2 where no circuit element is disposed. The assembled circuit board 20 is constituted by a printed circuit board and the circuit elements mounted thereon. On the printed circuit board, printed patterns are formed for electrical conduction of the circuit elements. A printed pattern formed in the first portion P1 corresponds to the first electrically conducting section, and a printed pattern in the second portion P2 corresponds to the second electrically conducting section. Further, a printed pattern that is formed for electrically connecting the circuit in the first portion P1 to the circuit in the second portion P2 is referred to as a connecting pattern in order to distinguish it from the other parts of the printed pattern. Specifically, the part of the connecting pattern 251 that is formed in the first portion P1 is referred to as a "first connecting pattern", and the part of the connecting pattern 252 that is formed in the second portion P2 is referred to as a "second connecting pattern", and the part of the connecting pattern 25 that is formed in the divider portion 24 and connects the first connecting pattern 251 to the second connecting pattern 252 is referred to as a "third connecting pattern". That is, the first connecting pattern 251 is a part of the first electrically conducting sections formed in the first portion P1, the second connecting pattern 252 is a part of the second electrically conducting sections formed in the second portion P2, and the third connecting pattern 25 is the part of the printed pattern that is formed in the divider portion 24. In the divider portion 24, no circuit element is formed, and only the third connecting pattern 25 is formed. The assembled circuit board 20 is connected to the lithium-ion battery 11 via a lock terminal (not shown) disposed at a predetermined location in the second portion P2.

Figure 5:
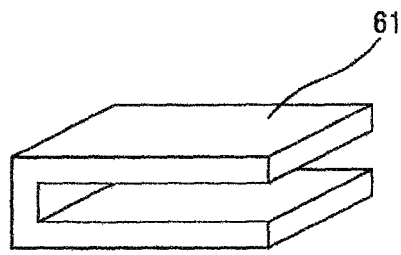
FIG. 5(a) is a schematic perspective view of a seal member to be attached to the assembled circuit board.
FIG. 5(b) is a schematic front view of the assembled circuit board and the seal members attached thereto.
FIG. 5(c) is a schematic cross sectional view of the assembled circuit board and the seal members attached thereto taken in the direction of the arrowed line A-A.
Figure 5:
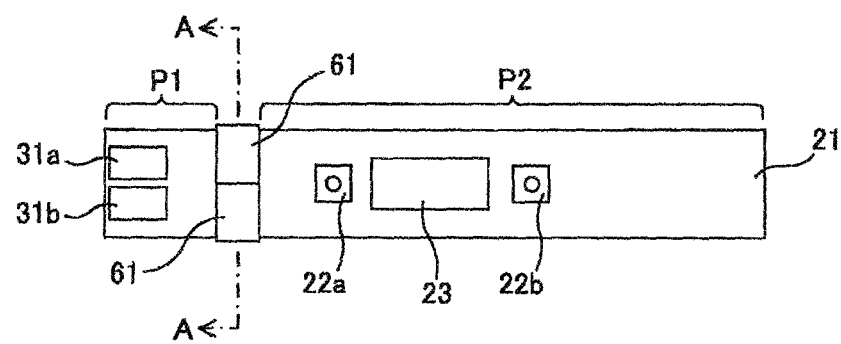
Figure 5:
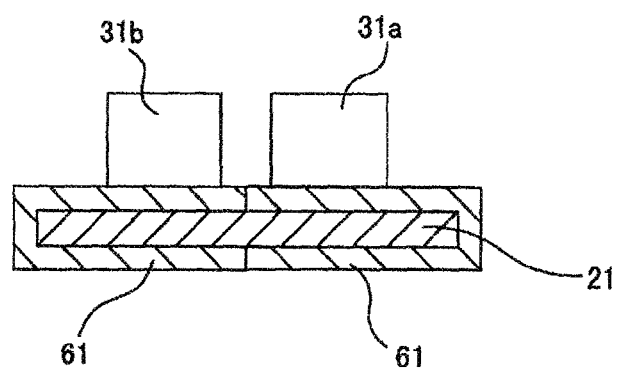

As described above, the assembled circuit board 20 is segmented into the first portion P1 and the second portion P2 by the divider portion 24. To the divider portion 24, flexible seal members are attached. FIG. 5(a) is a schematic perspective view of the seal member to be attached to the assembled circuit board 20, FIG. 5(b) is a schematic front view of the assembled circuit board 20 and the seal members attached thereto, and FIG. 5(c) is a schematic cross sectional view of the assembled circuit board 20 and the seal members attached thereto taken in the direction of the arrowed line A-A. As illustrated in FIG. 5(a), the seal member 61 is made of flexible plastic and is molded in an approximately U shape in the side view. Two seal members 61 are provided, and the two seal members 61 are fitted on the divider portion 24 of the assembled circuit board 20 as illustrated in FIG. 5(b) and the FIG. 5(c) respectively from the side ends. In this condition, the two seal members 61 are in close contact with each other. The third connecting pattern 25, which is formed in the divider portion 24 of the assembled circuit board 20, corresponds to the connecting portion of the present invention.

Figure 6A:
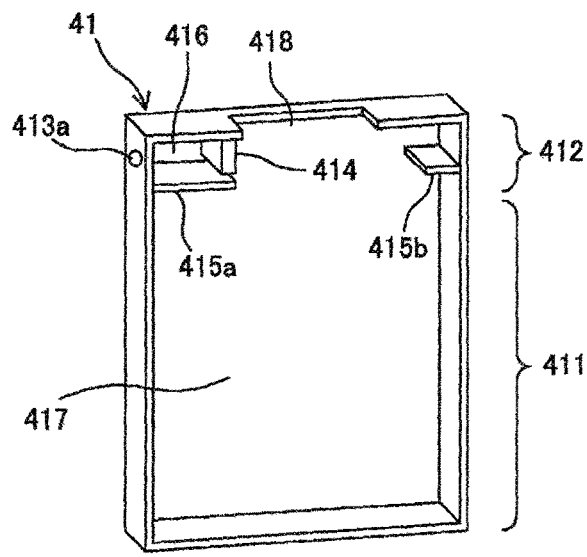
FIG. 6(a) is a schematic perspective view of a first case of a case of the portable rechargeable power supply device according to the first embodiment, FIG. 6 (b) is a schematic front view of the first case.

Next, the case 40 will be described. The case 40 houses the lithium-ion battery 11, the two terminals 31a, 31b, the operation sections 22a, 22b, the display section 23, the hazard prevention circuit unit 26, the control circuit unit 27, the display control circuit unit 28 and the remaining circuit unit 29. As illustrated in FIG. 1, the case 40 is composed of a first case 41 and a second case 42. The first case 41 and the second case 42 are roughly two respective halves of the case divided in the thickness direction. FIG. 6(a) is a schematic perspective view of the first case 41 of a case 40 of the portable rechargeable power supply device according to the first embodiment, FIG. 6 (b) is a schematic front view of the first case 41, and FIG. 6(c) is a schematic plan view of the case 40 in which the first case 41 and the second case 42 are assembled together.

Figure 6B:
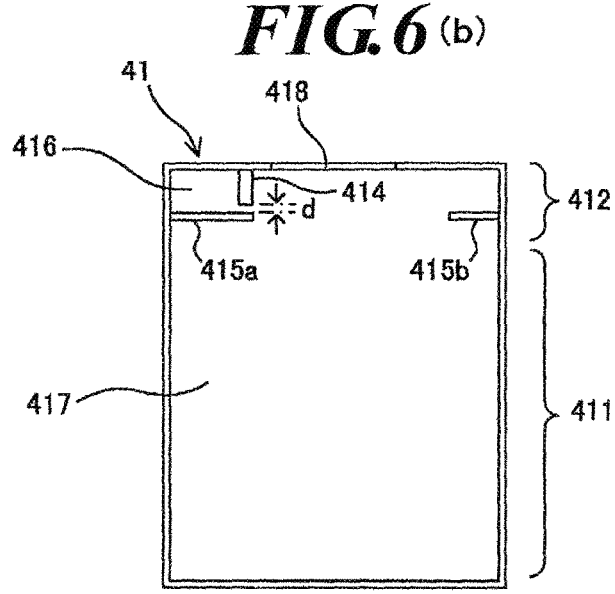
FIG. 6(c) is a schematic plan view of the case in which the first case and a second case are assembled together.
Figure 6C:
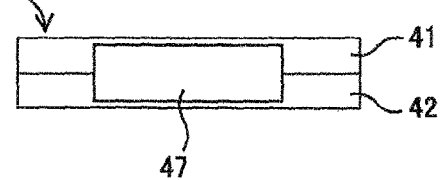

As illustrated in FIG. 6(a) and FIG. 6(b), the first case 41 is formed in an approximately cuboid box that is open at one side. The first case 41 includes a battery housing portion 411 in which the lithium-ion battery 11 is housed and a circuit board housing portion 412 in which the assembled circuit board 20 is housed. The first case 41 has one divider plate 414 and two mounting plates 415a, 415b formed therein. Specifically, the circuit board housing portion 412 is the upper portion of the first case 41, and the battery housing portion 411 is the remaining portion of the first case 41 other than the circuit board housing portion 412. The depth of the first case 41 is approximately a half the length of the short sides of the substrate 21, and the distance between the left side inner face and the right side inner face of the first case 41 is approximately equal to the length of the long sides of the substrate 21. The mounting plates 415a, 415b for mounting the assembled circuit board 20 are formed approximately horizontally in the circuit board housing portion 412 respectively at predetermined locations on the left side inner face and the right side inner face of the first case 41. The lateral width of the mounting plate 415a, which is formed on the left side inner face of the first case 41, is equal to the sum of the lateral width of the first portion P1 to which the terminals 31a, 31b are attached and the lateral width of the divider portion 24 of the assembled circuit board 20. The mounting plate 415a is in close contact with the left side inner face and the back face of the first case 41, and the mounting plate 415b is in close contact with the right side inner face and the back face of the first case 41. The divider plate 414 is formed in the circuit board housing portion 412 at a predetermined location on the upper side inner face of the first case 41, which extends downward in an approximately vertical direction from the upper side inner face of the first case 41. Specifically, the divider plate 414 is attached at a distance of the lateral width of the first portion P1 from the left side inner face of the first case 41. That is, the divider plate 414 is disposed at a location corresponding to the divider portion 24 of the assembled circuit board 20, and the lower end face of the divider plate 414 is opposed to the right end part of the mounting plate 415a. The distance d between the lower end face of the divider plate 414 and the upper face of the mounting plate 415a is slightly greater than the thickness of the substrate 21 of the assembled circuit board 20 in the divider portion 24. The divider plate 414 is in close contact with the upper side inner face and the back face of the first case 41.

The assembled circuit board 20 is mounted on the mounting plates 415a, 415b so that the assembled circuit board 20 is attached to the first case 41 in an approximately horizontal position. In this process, the seal members 61 attached to the divider portion 24 of the assembled circuit board 20 are pressed and squeezed between the divider plate 414 and the mounting plate 415a. Then, the lower end face of the divider plate 414 abuts the upper face of the squeezed seal members 61, and the upper face of the mounting plate 415a abuts the bottom faces of the first portion P1 and the squeezed seal members 61. As a result, the first portion P1 is partitioned by the divider plate 414 and the mounting plate 415a and is segmented from the second portion P2. Since the first portion P1 is surrounded by the divider plate 414 and the mounting plate 415a in this way, the two terminals 31a, 31b and the printed pattern formed in the first portion P1, i.e. the first electrically conducting section, are isolated from the other circuit elements.

Further, a terminal through hole 413a is formed in the left side face of the first case 41 at a predetermined location that corresponds to the location of the terminal 31a of the assembled circuit board 20 when the assembled circuit board 20 is housed in the circuit board housing portion 412. This makes the terminal 31a connectable from the outside through the terminal through hole 413a. Further, a rectangular cutout 418 is formed in the upper face of the first case 41 at a predetermined location that corresponds to the location of the display section 23 and the two operation sections 22a, 22b of the assembled circuit board 20 when the assembled circuit board 20 is housed in the circuit board housing portion 412.

The second case 42 is formed in approximately the same structure as the first case 41. That is, the second case 42 also includes a battery housing portion 411 in which the lithium-ion battery 11 is housed and a circuit board housing portion 412 in which the assembled circuit board 20 is housed. Inside the circuit board housing portion 412, two mounting plates 415a, 415b for mounting the assembled circuit board 20 and one divider plate 414 are formed. The mounting plates 415a, 415b and the divider plate 414 of the second case 42 are formed at the locations that correspond to the locations of the mounting plates 415a, 415b and the divider plate 414 of the first case 41 respectively. Further, as illustrated in FIG. 1(a) and FIG. 1(c), a terminal through hole 413b is formed at a predetermined location in the side face of the second case 42, and a rectangular cutout 418 is formed at a predetermined location in the upper face of the second case 42.

The first case 41 and the second case 42 are assembled and integrated with each other in a mutually opposed position by housing a half of the assembled circuit board 20 in the circuit board housing portion 412 of the first case 41 and thereafter housing the other half of the assembled circuit board 20 in the circuit board housing portion 412 of the second case 42. The case 40 as illustrated in FIG. 1 and FIG. 6(c) is thus obtained. In this condition, a rectangular opening 47 is formed at the part corresponding to the cutouts 418 of the integrated first case 41 and the second case 42. On the rectangular opening 47, the sealing sticker 50 with an operating instruction is pasted so as to close the opening 47. The sealing sticker 50 has a transparent part. A user can see the content displayed on the display section 23 and also operate the operation sections 22a, 22b through the sealing sticker 50 with the transparent part. Further, the user can connect a predetermined cable to the terminals 31a, 31b through the terminal through holes 413a, 413b.

As described above, the assembled circuit board 20 is housed in the first case 41 (or the second case 42), and thereafter the first case 41 and the second case 42 are assembled and integrated with each other. In this condition, the mounting plate 415a and the divider plate 414 of the first case 41, the mounting plate 415a and the divider plate 414 of the second case 42 and the divider portion 24 of the assembled circuit board 20 partition the inner space of the case 40 into a terminal housing case portion 416, in which the two terminals 31a, 31b and the printed pattern (first electrically conducting section) formed in the first portion P1 are housed, and a main body housing case portion 417, in which the lithium-ion battery 11, the operation sections 22a, 22b, the display section 23, the hazard prevention circuit unit 26, the control circuit unit 27, the display circuit unit 28, the remaining circuit unit 29 and the printed pattern (second electrically conducting section) formed in the second portion P2 are housed. That is, the case 40 is configured such that when the first case 41 and the second case 42 are integrated with each other to form the case 40, the terminal housing case portion 416 and the main body housing case portion 417 are partitioned from each other by the divider plates 414 and the mounting plates 415a. The first connecting pattern 251 formed in the first portion P1 and the second connecting pattern 252 formed in the second portion P2 are electrically connected to each other via the third connecting pattern 25 formed in the divider portion 24 between the divider plates 414 and the mounting plates 415a. The divider plates 414 and the mounting plates 415a serve as a partition between the terminal housing case portion 416 and the main body housing case portion 417, which corresponds to the dividing section of the present invention. In particular, the divider plate 414 and the mounting plate 415a of the first case 41 correspond to the first divider plate of the present invention, and the divider plate 414 and the mounting plate 415a of the second case 42 correspond to the second divider plate of the present invention.

When the first case 41 and the second case 42 are integrated with each other, not only the outer frame end face of the first case 41 abuts the outer face end face of the second case 42, but also the end face of the mounting plate 415a of the first case 41 abuts the end face of the mounting plate 415a of the second case 42, and the end face of the divider plate 414 of the first case 41 also abuts the end face of the divider plate 414 of the second case 42. Furthermore, the divider plate 414 of the first case 41 and the divider plate 414 of the second case 42 are in pressure contact with the seal members 61 attached to the divider portion 24 of the assembled circuit board 20. The seal members 61 serves as sealing section that closes a gap between the divider plates 414 and the divider portion 24 of the assembled circuit board 20 and a gap between the mounting plates 415a and the divider portion 24 of the assembled circuit board 20. By being in pressure contact with the seal members 61 disposed in the divider portion 24 of the assembled circuit board 20, the divider plates 414 and the mounting plates 415a as the dividing section can prevent leaked water in the terminal housing case portion 416 from further leaking into the main body housing case portion 417 through a gap between the dividing section and the divider portion 24 of the assembled circuit board 20. Accordingly, when the first case 41 and the second case 42 are integrated with each other and the sealing sticker is pasted on the opening 47 of the main body housing case portion 417, the inner space of the main body housing case portion 417 is in a hermetically sealed condition. Even when rain water, etc. leaks into the terminal housing case portion 416 through the terminals 31a, 31b or the surrounding part thereof, this can prevent the leaked rain water, etc. from further leaking into the main body housing case portion 417. Therefore, the hazard prevention circuit unit 26 can be prevented from being damaged by rain water, etc., and a serious incident due to overcharge and the like can be prevented.

Figure 7:
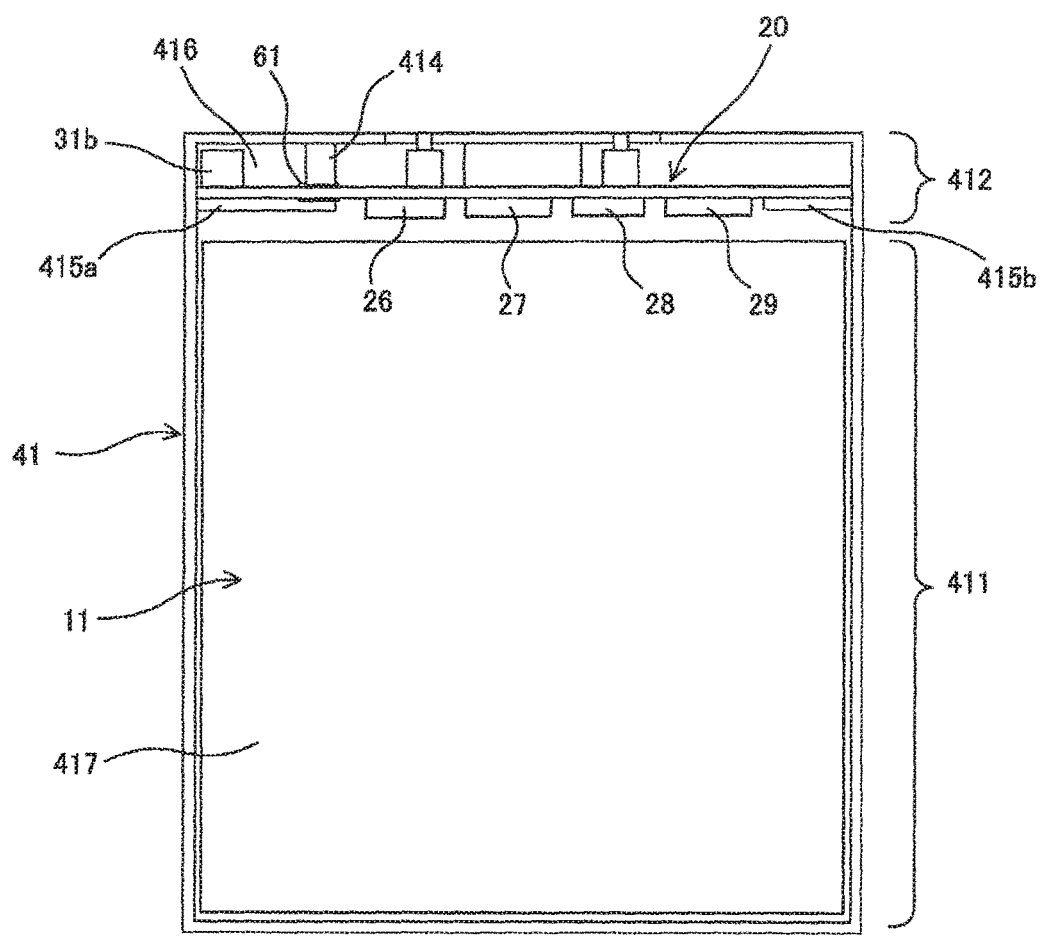
FIG. 7 illustrates an arrangement in which the lithium-ion battery and the assembled circuit board are housed in the first case.

Next, a process of assembling the portable rechargeable power supply device of the first embodiment will be described. FIG. 7 illustrates an arrangement in which the lithium-ion battery 11 and the assembled circuit board 20 are housed in the first case 41.

First, the lithium-ion battery 11 and the assembled circuit board 20 are electrically connected to each other by using a cable. Next, as illustrated in FIG. 7, the lithium-ion battery 11 is housed in the battery housing portion 411 of the first case 41, and the assembled circuit board 20 is housed in the circuit board housing portion 412 of the first case 41. Specifically, the assembled circuit board 20 is attached to the first case 41 by positioning the assembled circuit board 20 so that the divider portion 24 of the assembled circuit board 20 is aligned with the divider plate 414 of the first case 41 and thereafter mounting the assembled circuit board 20 on the mounting plate 415a, 415b while pushing the divider portion 24 into a gap between the divider plate 414 and the mounting plate 415a so that the divider plate 414 comes in pressure contact with the seal members 61. In this step, the seal members 61 attached to the divider portion 24 are pressed and squeezed between the divider plate 414 and the mounting plate 415a. In FIG. 7, the cable that electrically connects the lithium-ion battery 11 to the assembled circuit board 20 is omitted.

Next, the assembled circuit board 20 is housed in the second case 42 by placing the second case 42 on the first case 41 in which the lithium-ion battery 11 and the assembled circuit board 20 are housed. In this step, an adhesive is applied to the contact surface between the first case 41 and the second case 42, so that the first case 41 and the second case 42 are integrated with each other by means of the adhesive. Along with the integration, the seal members 61 attached to the divider portion 24 are squeezed also by the divider plate 414 of the second case 42. As a result, the case 40 is partitioned into the terminal housing case portion 416 and the main body housing case portion 417 by the divider plates 414 and the mounting plates 415a, while the first portion P1 of the assembled circuit board 20 is housed in the terminal housing case portion 416, and the lithium-ion battery 11 and the second portion P2 of the assembled circuit board 20 are housed in the main body housing case portion 417. Since the assembled circuit board 20 is attached in the case 40 such that the divider plates 414 and the mounting plates 415a are in pressure contact with the seal members 61, there is no gap between the divider plates 414 and the divider portion 24 of assembled circuit board 20 and between the mounting plates 415a and the divider portion 24 of the assembled circuit board 20. Thereafter, the transparent sealing sticker 50 is pasted on the opening 47 of the case 40 (main body housing case portion 417). As a result, the main body housing case portion 417 is hermetically sealed. In this way, the portable rechargeable power supply device of the first embodiment can be assembled easily.

In the portable rechargeable power supply device of the first embodiment, the divider plates and the mounting plates serve as the dividing section to partition the case into the terminal housing case portion, in which the two terminals and the printed pattern (including the first connecting pattern) as the first electrically conducting sections are housed, and the main body housing case portion, in which the lithium-ion battery, the hazard prevention circuit unit, the printed pattern (including the second connecting pattern) as the second electrically conducting sections, etc. are housed. Further, the first electrically conducting sections and the second electrically conducting sections are electrically connected to each other via the third connecting pattern formed in the divider portion of the assembled circuit board, and the seal members as the sealing section closes the gap between the dividing section and the divider portion of the assembled circuit board. With this configuration, the dividing section can prevent leaked water in the terminal housing case portion that has leaked in through the two terminals and the surrounding part thereof from further leaking into the main body housing case portion through a gap between the dividing section and the divider portion of the assembled circuit board. Even when rain water, etc. leaks into the terminal housing case portion through the two terminals or the surrounding part thereof, further leakage of the leaked rain water, etc. into the main body housing case portion can be prevented. Therefore, the hazard prevention circuit unit housed in the main body housing case portion can be prevented from being damaged by rain water, etc., and a serious incident due to overcharge and the like can be prevented.

In the portable rechargeable power supply device of the first embodiment, the assembled circuit board is segmented into the first portion in which the two terminals are mounted and the second portion in which the hazard prevention circuit unit, the control circuit unit, the operation section, the display section and the display control circuit unit are disposed, wherein the divider portion serves as the boundary between them in which the third connecting pattern is formed to connect the first connecting pattern formed in the first portion and the second connecting pattern formed in the second portion to each other. Further, the seal members as the sealing section are attached to the divider portion of the assembled circuit board. This configuration allows to house the circuit elements at respective predetermined locations in the terminal housing case portion or the main body housing case portion only by attaching the assembled circuit board to the first case and the second case such that the divider plates and the mounting plates are in pressure contact with the seal members and that the first portion and the second portion of the assembled circuit board are housed respectively in the terminal housing case portion and the main body housing case portion. Further, since the first case with the divider plate and the mounting plate formed therein and the second case having approximately the same structure as the first case are assembled and integrated with each other so that the terminal housing case portion and the main body housing case portion are defined in the integrated first and second cases, the portable rechargeable power supply device can be assembled easily.

In the portable rechargeable power supply device of the first embodiment, since the two terminals are disposed closely to each other in the terminal housing case portion so that plugs of air-conditioned cloths cannot be inserted in both terminals at the same time, an improper use of the portable rechargeable power supply device can be prevented, such as using an air-conditioned cloth while charging the lithium-ion battery.

Furthermore, in the portable rechargeable power supply device of the first embodiment, since the two terminals function as input/output common terminals for charging the lithium-ion battery and supplying electric power from the lithium-ion battery externally, even when one input/output common terminal fails, the other working input/output common terminal can be used instead, and the failure rate of the portable rechargeable power supply device can therefore be decreased to a great extent.

In the above-described first embodiment, the approximately U-shaped seal members of flexible plastic are used as the sealing section. However, a variety of general materials can be used as the sealing section.

In the above-described first embodiment, the first case and the second case are integrated with each other by means of an adhesive. However, the first case and the second case can be integrated with each other by a variety of methods such as mechanical methods.

Second Embodiment

Figure 8A:
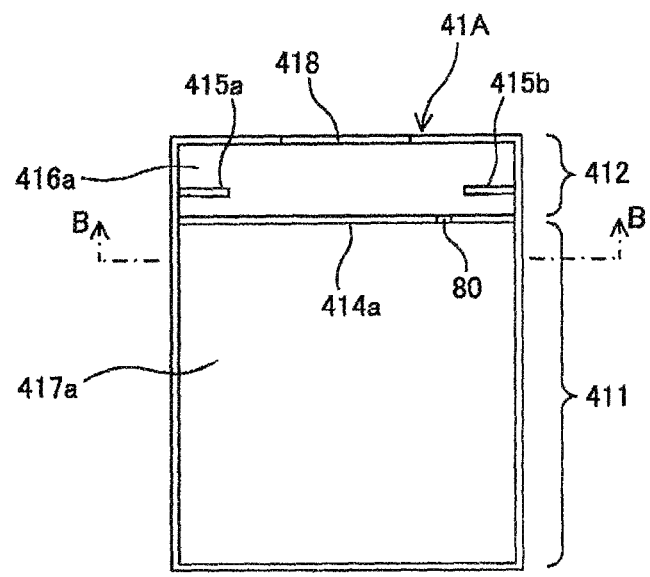
FIG. 8(a) is a schematic front view of a first case of a portable rechargeable power supply device according to a second embodiment.
Figure 8B:
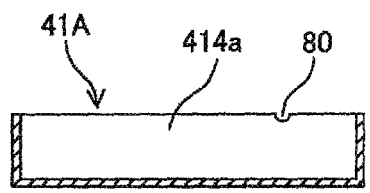
FIG. 8(b) is a schematic cross sectional view of the first case taken in the direction of the arrowed line B-B.
Figure 8C:
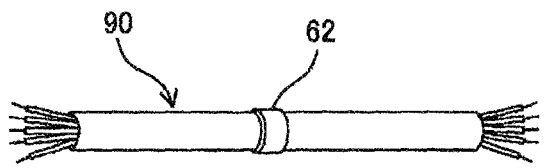
FIG. 8(c) is a schematic perspective view of a multi-conductor cable with a seal of the portable rechargeable power supply device according to the second embodiment.

Next, a second embodiment of the present invention will be described. FIG. 8(a) is a schematic front view of a first case of a portable rechargeable power supply device according to the second embodiment, FIG. 8(b) is a schematic cross sectional view of the first case taken in the direction of the arrowed line B-B, and FIG. 8(c) is a schematic perspective view of a multi-conductor cable with a seal of the portable rechargeable power supply device according to the second embodiment. The outer appearance of the portable rechargeable power supply device of the second embodiment is approximately the same as the outer appearance of the portable rechargeable power supply device of the first embodiment in FIG. 1. Accordingly, FIG. 1 is referenced also for the description of the portable rechargeable power supply device of the second embodiment. The same reference signs are denoted to the components of the second embodiments that have the same function as those of the first embodiment, and the detailed description thereof is omitted.

As illustrated in FIG. 1 and FIG. 8, the portable rechargeable power supply device of the second embodiment includes a lithium-ion battery (not shown), an assembled circuit board (not shown), a plastic case 40 and a multi-conductor cable with a seal 90. The lithium-ion battery of the second embodiment is the same as that of the first embodiment. The assembled circuit board of the second embodiment is different from the assembled circuit board of the first embodiment in that a hazard prevention circuit unit is not mounted thereon. That is, on the assembled circuit board of the second embodiment, two terminals, two operation sections, a display section, a control circuit unit, a display control circuit unit and a remaining circuit unit are mounted.

As with the first embodiment, the case 40 of the second embodiment is composed of first and second two cases that are roughly two respective halves of the case divided in the thickness direction. However, the first case and the second case have a structure different from the first case and the second case of the first embodiment. As illustrated in FIG. 8(a), the first case 41A of the second embodiment is formed in an approximately cuboid box that is open at one side. The first case 41A includes a battery housing portion 411 and a circuit board housing portion 412 in which the assembled circuit board is housed. Specifically, the circuit board housing portion 412 is the upper portion of the first case 41A, and the battery housing portion 411 is the remaining portion of the first case 41A other than the circuit board housing portion 412. In the battery housing portion 411, the lithium-ion battery and the hazard prevention circuit unit are housed. That is, in the second embodiment, the hazard prevention circuit unit is mounted on another circuit board other than the assembled circuit board, and this circuit board is housed in the battery housing portion 411. The lithium-ion battery and the hazard prevention circuit unit are electrically connected to each other.

Mounting plates 415a, 415b for mounting the assembled circuit board are attached approximately horizontally in the circuit board housing portion 412 at predetermined locations respectively on the left side inner face and the right side inner face of the first case 41A. A divider plate 414a is formed approximately horizontally at a predetermined location of the first case 41A which corresponds to the boundary between the circuit board housing portion 412 and the battery housing portion 411. In the divider plate 414a, a semicircular cutout 80 is formed.

The second case has approximately the same structure as the first case 41A. That is, the second case also includes a battery housing portion 411 in which the lithium-ion battery and the hazard prevention circuit unit are housed and a circuit board housing portion 412 in which the assembled circuit board is housed. Mounting plates 415a, 415b for mounting the assembled circuit board 20 are attached in the circuit board housing portion 412, and a divider plate 414a is attached between the circuit board housing portion 412 and the battery housing portion 411. The divider plate 414a has a semicircular cutout 80.

The first case 41A and the second case are assembled and integrated with each other in a mutually opposed position by housing the assembled circuit board in the circuit board housing portion 412 of the first case 41A and thereafter housing it in the circuit board housing portion 412 of the second case. The case 40 is thus obtained. As a result, a round through hole is formed at a location corresponding to the cutouts 80 of the integrated first case 41A and second case. The through hole allows penetration of the multi-conductor cable 90. The gap between the through hole and the multi-conductor cable 90 is closed by means of a seal member, which is described below. Further, as with the first embodiment, a sealing sticker with a transparent part is pasted on a rectangular opening of the case 40.

When the assembled circuit board is housed in the first case 41A (or the second case) and thereafter the first case 41A and the second case are assembled and integrated with each other, the divider plate 414a of the first case 41A and the divider plate 414a of the second case partition the inner space of the case 40 into a terminal housing case portion 416a in which the two terminals, the operation section, the display section, the control circuit unit, the display circuit unit and the remaining circuit unit are housed and a main body housing case portion 417a in which the lithium-ion battery and the hazard prevention circuit unit are housed. That is, in the second embodiment, the terminal housing case portion 416a corresponds to the circuit board housing portions 412, and the main body housing case portion 417a corresponds to the battery housing portions 411. As described above, the divider plates 414a serve as a partition between the terminal housing case portion 416a and the main body housing case portion 417a, which corresponds to the dividing section of the present invention.

As illustrated in FIG. 8(c), the multi-conductor cable with a seal 90 is constituted by a coated bundle of plural insulated conducting wires. The multi-conductor cable 90 has an approximately circular cross section. The multi-conductor cable 90 includes a highly flexible seal member 62 disposed in the center part thereof. The outer diameter of the seal member 62 is slightly greater than the diameter of the through hole formed in the divider plates 414*a*. The multi-conductor cable 90 is inserted in the through hole. One end of the multi-conductor cable 90 is connected to the assembled circuit board housed in the terminal housing case portion 416*a*, and the other end is connected to the hazard prevention circuit housed in the main body housing case portion 417*a*. Of the multi-conductor cable 90, the part housed in the terminal housing case portion 416*a* corresponds to the first electrically conducting section of the present invention, the part housed in the main body housing case portion 417*a* corresponds to the second electrically conducting section of the present invention, and the part disposed in the round through hole corresponds to the connecting portion of the present invention.

When the first case 41A and the second case are integrated with each other, the divider plate 414*a* of the first case 41A comes in close contact with the divider plate 414*a* of the second case. Accordingly, when the components are housed and the first case 41A and the second case are then integrated with each other, the inner space of the main body housing case portion 417*a* is hermetically sealed. As a result, even when rain water, etc. leaks into the terminal housing case portion 416*a* through the terminals and the surrounding part thereof, further leakage of the leaked rain water, etc. into the main body housing case portion 417*a* can be prevented. Therefore, the hazard prevention circuit unit can be prevented from being damaged by rain water, etc., and a serious incident due to overcharge and the like can be prevented. In practice, even when rain water leaks into the terminal housing case portion of this embodiment through any part, the leaked water does not further leak into the main body housing case portion. Therefore, the term "the surrounding part thereof" in the phrase "even when rain water, etc. leaks into the terminal housing case through the terminals and the surrounding part thereof" broadly mean any part in the terminal housing case portion in which the terminals are housed.

Next, a process of assembling the portable rechargeable power supply device of the second embodiment will be described.

First, the assembled circuit board is electrically connected to the circuit board with the hazard prevention circuit unit mounted thereon by means of the multi-conductor cable with the seal 90. Subsequently, the lithium-ion battery and the circuit board with the hazard prevention circuit unit mounted thereon are housed in the battery housing portion 411 of the first case 41A. Then, the assembled circuit board is mounted on the mounting plates 415*a*, 415*b* and is housed in the circuit board housing portion 412 of the first case 41. Thereafter, the seal member 62 of the multi-conductor cable with the seal 90 is fitted in the cutout 80 of the first case 41.

Next, the second case is placed on the first case 41A. In this step, an adhesive is applied to the contact surfaces of the first case 41A and the second case, and the first case 41A and the second case are integrated with each other by means of the adhesive. As a result, the case 40 is partitioned into the terminal housing case portion 416*a* and the main body housing case portion 417*a*. While the assembled circuit board and the first electrically conducting sections are housed in the terminal housing case portion 416*a*, only the lithium-ion battery, the circuit board with the hazard prevention circuit unit mounted thereon and the second electrically conducting sections are housed in the main body housing case portion 417*a*. The seal member 62 disposed in the through hole is squeezed between the divider plate 414*a* of the first case 41A and the divider plate 414*a* of the second case, and no gap is formed between the multi-conductor cable 90 and the divider plates 414*a*. As a result, the main body housing case portion 417*a* is hermetically sealed. The portable rechargeable power supply device of the second embodiment is thus completed.

In the portable rechargeable power supply device of the second embodiment, the divider plates serve as the dividing section to partition the case into the terminal housing case portion, in which the two terminals, the operation section, the display section, the control circuit unit, the display control circuit unit, the first electrically conducting sections and the like are housed, and the main body housing case portion, in which the lithium-ion battery, the hazard prevention circuit unit and the second electrically conducting sections are housed. Further, the multi-conductor cable is disposed in the through hole formed in the divider plates such that the seal member is interposed therebetween, and the assembled circuit board and the hazard prevention circuit unit are electrically connected to each other by means of the multi-conductor cable which also serves as the first electrically conducting section and the second electrically conducting section. In this configuration, the divider plates can prevent leaked water in the terminal housing case portion that has leaked in through the two terminals and the surrounding part thereof from further leaking into the main body housing case portion through the through hole formed in the divider plates. Even when rain water, etc. leaks into the terminal housing case portion through the two terminals or the surrounding part thereof, i.e. even when rain water, etc. leaks into the terminal housing case portion through any part, further leakage of the leaked rain water, etc. into the main body housing case portion can be prevented. Therefore, the hazard prevention circuit unit housed in the main body housing case portion can be prevented from being damaged by rain water, etc., and a serious incident due to overcharge and the like can be prevented. Further, since the first case with the divider plate and the mounting plate formed therein and the second case having approximately the same structure as the first case are assembled and integrated with each other so that the terminal housing case portion and the main body housing case portion are defined in the assembled first and second cases, the portable rechargeable power supply device can be assembled easily.

Figure 9:
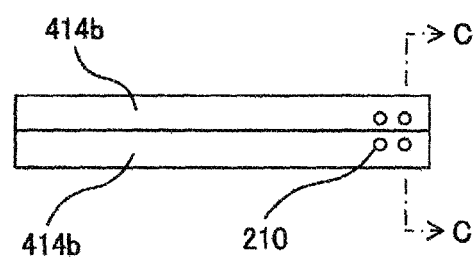
FIG. 9(a) is a schematic front view of divider plates and electrodes attached thereto that serve as a connecting portion of the present invention.
FIG. 9(b) is a schematic enlarged cross sectional view of the divider plates taken in the direction of the arrowed line C-C.
Figure 9:
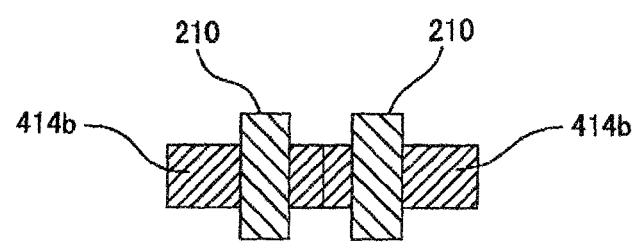

The second embodiment illustrates an example in which the single multi-conductor cable is used as both of the first electrically conducting section and the second electrically conducting section. Instead, at least one through holes may be formed in the divider plates, and an electrode that corresponds to the connecting portion electrically connecting the first electrically conducting section to the second electrically conducting section may be fitted in each of the through holes such that no gap is formed between the electrode and the divider plates. FIG. 9(*a*) is a schematic front view of divider plates and electrodes attached thereto that serve as the connecting portion of the present invention, and FIG. 9(*b*) is a schematic enlarged cross sectional view of the divider plates taken in the direction of the arrowed line C-C. In the example of FIG. 9, two through holes are formed in the divider plate 414*b* of the first case, and two through holes are formed also in the divider plate 414*b* of the second case. In each of the through holes, a cylindrical electrode 210 is fitted. The outer diameter of the electrodes 210 is slightly greater than the diameter of the through holes.

Accordingly, when the electrodes 210 are fitted in the through holes, no gap is formed between the electrodes 210 and the through holes. One and the other ends of each of the electrodes 210 are respectively connected to an end of the first electrically conducting section and an end of the second electrically conducting section. Accordingly, the first electrically conducting section and the second electrically conducting section are electrically connected to each other via the electrodes 210.

Third Embodiment

Figure 10:
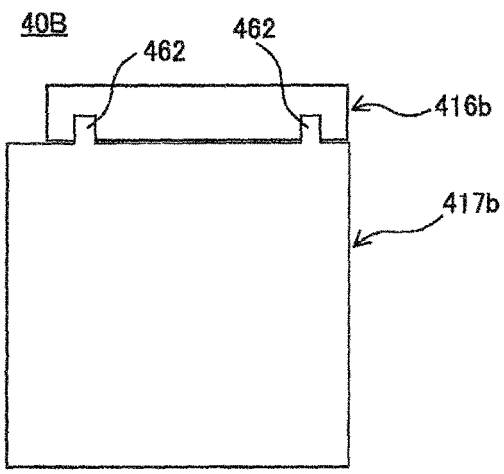
FIG. 10(a) is a schematic front view of a portable rechargeable power supply device according to a third embodiment.
FIG. 10(b) is a schematic perspective view of a main body housing case portion of the portable rechargeable power supply device.
FIG. 10(c) is a schematic perspective view of a terminal housing case portion of the portable rechargeable power supply device.
FIG. 10(d) is a schematic bottom view of the terminal housing case portion.
Figure 10:
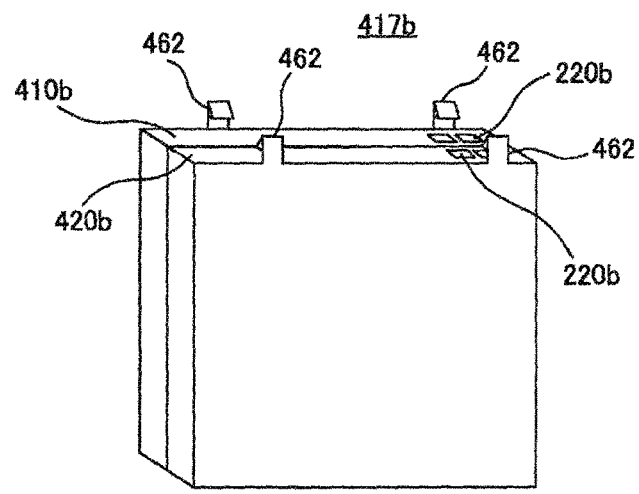
Figure 10:
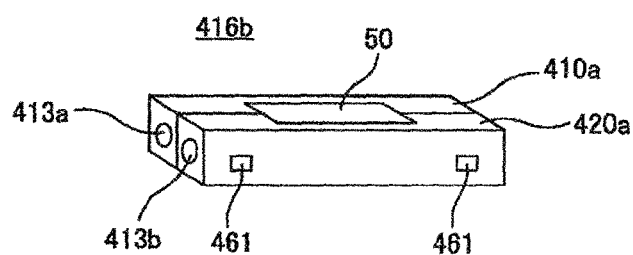
Figure 10:
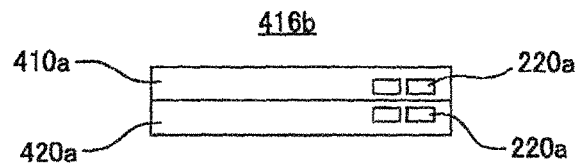
Figure 11:
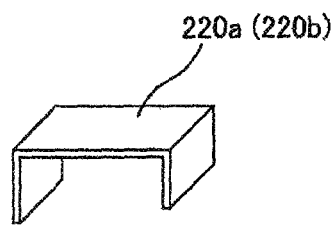
FIG. 11(a) is a schematic perspective view of an electrode to be attached to the main body housing case portion and the terminal housing case portion.
FIG. 11(b) is a schematic bottom view of the terminal housing case portion and the electrodes attached thereto.
FIG. 11(c) is an schematic enlarged cross sectional view of the terminal housing case portion taken in the direction of the arrowed line D-D.
Figure 11:
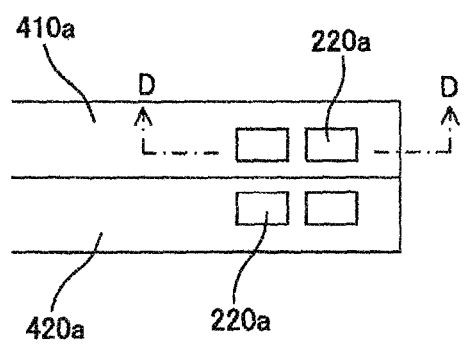
Figure 11:
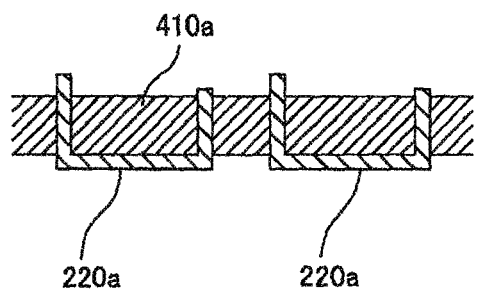

Next, a third embodiment of the present invention will be described. FIG. 10(*a*) is a schematic front view of a portable rechargeable power supply device according to the third embodiment, FIG. 10(*b*) is a schematic perspective view of a main body housing case portion of the portable rechargeable power supply device, FIG. 10(*c*) is a schematic perspective view of a terminal housing case portion of the portable rechargeable power supply device, and FIG. 10(*d*) is a schematic bottom view of the terminal housing case portion. FIG. 11(*a*) is a schematic perspective view of an electrode to be attached to the main body housing case portion and the terminal housing case portion, FIG. 11(*b*) is a schematic bottom view of the terminal housing case portion and electrodes attached thereto, and FIG. 11 (*c*) is an enlarged schematic cross sectional view of the terminal housing case portion taken in the direction of the arrowed line D-D. The same reference signs are denoted to the components of the third embodiment having the same function as those of the first embodiment or the second embodiment, and the description thereof is omitted.

As illustrated in FIG. 10(*a*) to FIG. 10(*d*), the portable rechargeable power supply device of the third embodiment includes a lithium-ion battery (not shown), an assembled circuit board (not shown) and a plastic case 40B. The portable rechargeable power supply device of the third embodiment is different from that of the second embodiment in that a terminal housing case portion 416*b* is detachable from a main body housing case portion 417*b*. The other configuration is the same as that of the second embodiment. That is, the lithium-ion battery is the same as that of the first embodiment, and the assembled circuit board is the same as that of the second embodiment.

The terminal housing case portion 416*b* houses the assembled circuit board and first electrically conducting sections. As illustrated in FIG. 10(*c*), the terminal housing case portion 416*b* is formed by assembling and integrating a first case 410*a* and a second case 420*a* with each other. As illustrated in FIG. 10(*d*), electrodes (first electrodes) 220*a* are disposed on a bottom plate (the bottom part) of the terminal housing case portion 416*b*, which are connected to ends of the first electrically conducting sections (not shown). For example, the first electrodes 220*a* are partly or completely embedded in the bottom plate of the terminal housing case portion 416*b*, and the first electrodes 220*a* are formed integrally with the bottom plate. Specifically, when the cases 410*a*, 420*a* are molded, the cases 410*a*, 420*a* are molded integrally with the first electrodes 220*a*. In the third embodiment, as illustrated in FIG. 11(*a*), each of the first electrodes 220*a* includes a flat body and two legs formed at the ends of the body. The two legs of each first electrode 220*a* have different lengths, and each longer leg is connected to an end of the first electrically conducting section. As illustrated in FIG. 10(*c*), four dents 461 are formed on side faces of the terminal housing case portion 416*b*. Further, terminal through holes 413*a*, 413*b* are formed in another side face other than the side faces in which the four dents 461 are formed.

On the other hand, the main body housing case portion 417*b* houses the lithium-ion battery, a circuit board with the hazard prevention circuit unit mounted thereon and the second electrically conducting sections. As illustrated in FIG. 10(*b*), the main body housing case portion 417*b* is formed by assembling and integrating a first case 410*b* and a second case 420*b* with each other. The top plate (the top part) of the main body housing case portion 417*b* corresponds to the dividing section of the present invention. As with the terminal housing case portion 416*b*, electrodes (second electrodes) 220*b* that are connected to ends of the second electrically conducting sections (not shown) are partly or completely embedded in the top plate, and the second electrodes 220*b* are formed integrally with the top plate of the main body housing case portion 417*b*. The second electrodes 220*b* are also the same as the electrode illustrated in FIG. 11(*a*), and the case 410*b*, 420*b* are integrally molded with the second electrodes 220*b*. In this embodiment, the second electrodes 220*b* correspond to the connecting portion of the present invention. Instead of molding the cases integrally with the electrodes, a variety of general methods may be used for forming the electrodes and the cases integrally.

In the upper part of the main body housing case portion 417*b*, four upwardly protruding hooks 462 are formed. When the terminal housing case portion 416*b* is mounted on the main body housing case portion 417*b* such that the bottom plate of the terminal housing case portion 416*b* faces the top plate of the main body housing case portion 417*b*, the hooks 462 are fitted in the corresponding dents 461 so that the fit between hooks 462 and the dents 461 is made. In this way, the terminal housing case portion 416*b* can be easily attached to the main body housing case portion 417*b*. In this condition, the first electrodes 220*a* attached to the bottom plate of the terminal housing case portion 416*b* are in pressure contact with the second electrodes 220*a* attached to the top plate of the main body housing case portion 417*b*. That is, in the third embodiment, the first electrodes 220*a*, which are attached to the bottom plate of the terminal housing case portion 416*b*, and the second electrodes 220*b*, which are attached to the top plate of the main body housing case portion 417*b*, are configured such that when the terminal housing case portion 416*b* is attached to the main body housing case portion 417*b*, they come electrically in contact with each other.

By releasing the fit between the hooks 462 and the dents 461, the terminal housing case portion 416*b* can be easily detached from the main body housing case portion 417*b*.

As illustrated in FIG. 10 (*a*), the lateral width of the terminal housing case portion 416*b* is shorter than the lateral width of the main body housing case portion 417*b*. Accordingly, when the terminal housing case portion 416*b* is attached to the main body housing case portion 417*b*, a step is formed in the upper left of the main body housing case portion 417*b*. The step serves as a space where a plug of an air-conditioned cloth is placed when it is connected to the terminals. This allows the plug not to protrude from the case 40B and can avoid the plug being subjected to a large force during use of the air-conditioned cloth by mistake. Therefore, probability of the plug and the terminals being damaged can be decreased to a great extent.

In the portable rechargeable power supply device of the third embodiment, when the terminal housing case portion 416*b* is detached from the main body housing case portion

417*b*, there is a possibility that a user mistake causes a short-circuit of the second electrodes attached to the top plate of the main body housing case portion 417*b*. To cope with the problem, in the third embodiment, the hazard prevention circuit unit includes a short-circuit prevention circuit unit (short-circuit prevention section), such as one using a PTC (positive temperature coefficient). Accordingly, when the second electrodes in the main body housing case portion 417*b* are short-circuited, the short-circuit prevention circuit unit can break the electric current immediately.

In the portable rechargeable power supply device of the third embodiment, the dividing section partitions the case into the terminal housing case portion, in which the two terminals, the operation section, the display section, the control circuit unit, the display control circuit unit and the first electrically conducting sections and the like are housed, and the main body housing case portion, in which the lithium-ion battery, the hazard prevention circuit unit and the second electrically conducting sections are housed. Further, the first electrically conducting sections and the second electrically conducting sections are electrically connected to each other via the first electrodes attached to the bottom plate of the terminal housing case portion and the second electrodes attached to the top plate of the main body housing case portion. The first electrodes and the second electrodes are integrated respectively with the terminal housing case portion and the main body housing case portion. In this configuration, the dividing section can prevent leaked water in the terminal housing case portion that has leaked in through the two terminals and the surrounding part thereof from further leaking into the main body housing case portion through a predetermined part of the dividing section. Even when rain water, etc. leaks into the terminal housing case portion through the two terminals or the surrounding part thereof, further leakage of the leaked rain water, etc. into the main body housing case portion can be prevented. Therefore, the hazard prevention circuit unit housed in the main body housing case portion can be prevented from being damaged by rain water, etc., and a serious incident due to overcharge and the like can be prevented. In particular, in the third embodiment, since the terminal housing case portion and the main body housing case portion are detachable from each other, the user can easily detach the terminal housing case portion from the main body housing case portion to store up them when the portable rechargeable power supply device is not used.

Figure 12:
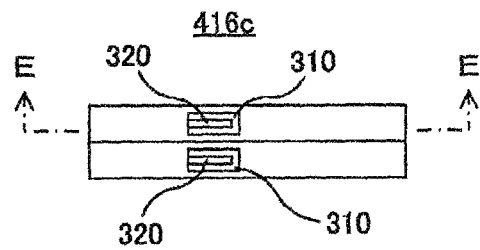
FIG. 12(a) is a schematic bottom view of a terminal housing case portion of a portable rechargeable power supply device according to a variation of the third embodiment.
FIG. 12(b) is a schematic cross sectional view of the terminal housing case portion of the portable rechargeable power supply device taken in the direction of the arrowed line E-E.
FIG. 12(c) is a schematic perspective view of a main body housing case portion of the portable rechargeable power supply device.
FIG. 12(d) illustrates the relationship between second electrodes disposed in the top plate of the main body housing case portion and a circuit board housed in the main body housing case portion in the portable rechargeable power supply device.
Figure 12:
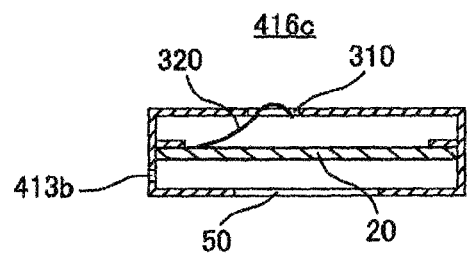
Figure 12:
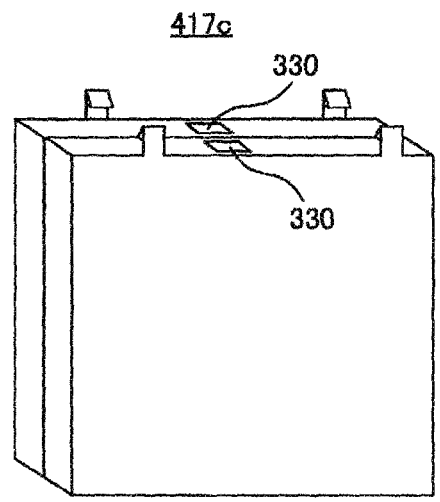
Figure 12:
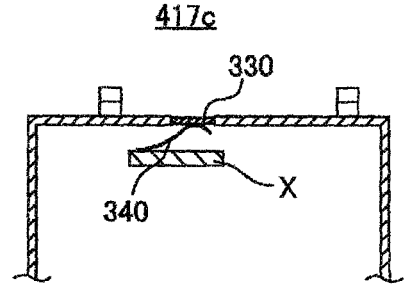

The third embodiment illustrates an example in which the first electrodes are connected to ends of the first electrically conducting sections and are embedded in the bottom plate of the terminal housing case portion, and when the terminal housing case portion is attached to the main body housing case portion, the first electrodes come in pressure contact with the second electrodes attached to the top plate of the main body housing case portion, so that the circuit board housed in the terminal housing case portion is connected to the circuit board housed in the main body housing case portion. Instead of this, a variety of other methods can be used for connecting the circuit board housed in the terminal housing case portion to the circuit board housed in the main body housing case portion. In the following, a variation of the third embodiment will be described. FIG. 12(*a*) is a schematic bottom view of a terminal housing case portion of a portable rechargeable power supply device according to the variation of the third embodiment, FIG. 12(*b*) is a schematic cross sectional view of the terminal housing case portion of the portable rechargeable power supply device taken in the direction of the arrowed line E-E, FIG. 12(*c*) is a schematic perspective view of a main body housing case portion of the portable rechargeable power supply device, and FIG. 12(*d*) illustrates the relationship between second electrodes disposed in the top plate of the main body housing case portion and a circuit board housed in the main body housing case portion in the portable rechargeable power supply device. In FIG. 12(*b*), the circuit elements that are mounted on the circuit board housed in the terminal housing case portion, and the like are omitted.

The variation is different from the third embodiment in that first electrodes are constituted by elastic electrodes having a bar or rod shape, and that the tips of the elastic electrodes protrude from openings that are formed in the bottom plate of the terminal housing case portion. Further, two first electrodes and two second electrodes are provided. That is, in this variation, each pair of electrodes serves as a positive electrode and a negative electrode. The other configuration is the same as that of the above-described third embodiment, and the detailed description thereof is omitted.

In this variation, as illustrated in FIG. 12(*a*), two openings 310, 310 are formed in the bottom plate of the terminal housing case portion 416*c*. Further, as illustrated in FIG. 12(*b*), one end of a plate or rod-shaped elastic electrode 320 is attached to an assembled circuit board 20 housed in the terminal housing case portion 416*c*. The elastic electrode 320 is disposed such that the other end slightly protrudes outward from the opening 310. As illustrated in FIG. 12(*b*), the other end of the elastic electrode 320 is bent approximately in a U shape. The elastic electrode 320 as described above corresponds to the first electrode and the first electrically conducting section of the present invention. Specifically, of the elastic electrode 320, the part located in and at the outer side of the opening 310 corresponds to the first electrode of the present invention, and the other part corresponds to the first electrically conducting section of the present invention. On the other hand, as illustrated in FIG. 12(*c*) and FIG. 12(*d*), two openings are formed also in the top plate of the main body housing case portion 417*c*, and a plate electrode 330 as the second electrode of the present invention is fitted in each opening. The electrode plate 330 has a flat surface. The electrode plate 330 is tightly fitted in the opening, and the main body housing case portion 417*c* is therefore hermetically and completely sealed. Further, a circuit board X with a hazard prevention circuit unit mounted thereon is housed in the main body housing case portion 417*c*, and one end of an elastic electrode 340 having a rod or plate shape is attached to the upper face thereof. The other end of the elastic electrode 340 is in contact with the bottom face of the electrode plate 330, and the circuit board X housed in the main body housing case portion 417*c* is electrically connected to the electrode plate 330 accordingly. As illustrated in FIG. 12(*d*), the other end of the elastic electrode 340 is bent approximately in a U shape. In this variation, since the elastic electrode 320 partly protrudes outward from the opening 310 of the terminal housing case portion 416*c* as described above, when the terminal housing case portion 416*c* is attached to the main body housing case portion 417*c*, the end of the elastic electrode 320 comes in pressure contact with the upper face of the electrode plate 330 attached to the top plate of the main body housing case portion 417*c*.

Since the terminal housing case portion 416*c* has the openings 310 in the bottom plate thereof, when the terminal housing case portion 416*c* is detached from the main body housing case portion 417*c*, rain water, etc. may leak into the terminal housing case portion 416*c* from the openings 310 as well as from the terminals and the surrounding part thereof.

However, even in such cases, since main body housing case portion 417c in which the hazard prevention circuit unit is housed is hermetically and completely sealed, leakage of rain water, etc. into the main body housing case portion 417c can be prevented.

In the third embodiment, the hooks formed in the main body housing case portion are fitted in the dents formed in the terminal housing case portion so that the terminal housing case portion is attached to the main body housing case portion. However, the manner of attaching the terminal housing case portion to the main body housing case portion is not limited thereto. In general, to make the terminal housing case portion detachable from the main body housing case portion, they may be configured such that a first fitting section and a second fitting section that can fit with the first fitting section are provided respectively in the terminal housing case portion and the main body housing case portion, and the fit between the first fitting section and the second fitting section are made and released.

In the third embodiment (including the variation), the terminal housing case portion is detachable from the main body housing case portion. Therefore, to charge the lithium-ion battery housed in the main body housing case portion, the second electrodes attached to the top plate of the main body housing case portion may be directly used as charging electrodes without the terminal housing case portion, and a dedicated charger may be used to charge the lithium-ion battery. In this case, it is not required that the assembled circuit board housed in the terminal housing case portion has a circuit function for charging.

Furthermore, in the third embodiment, the terminal housing case portion (main body housing case portion) is formed by assembling and integrating the first case and the second case having an approximately the same structure as the first case with each other. However, the terminal housing case portion (main body housing case portion) may be formed by other methods. For example, the terminal housing case portion (main body housing case portion) may be formed by preparing a box that is open at one side and attaching a top plate thereto to close the open side.

Other Embodiments

The present invention is not limited to the above-described embodiments, and various changes can be made within the features of the present invention.

The above-described embodiments illustrate examples in which the portable rechargeable power supply device of the present invention includes the two terminals. However, it may include three, four or more terminals. In such cases, the terminals are desirably arranged closely to each other in the terminal housing case portion so that plugs of external devices cannot be inserted in any two terminals at the same time. Alternatively, the portable rechargeable power supply device of the present invention may include only one terminal.

The above-described embodiments illustrate examples in which the portable rechargeable power supply device of the present invention includes the single lithium-ion battery. However, it may include two or more lithium-ion batteries.

The above-described embodiments illustrate examples in which the portable rechargeable power supply device of the present invention includes the display section. However, it does not necessarily include a display section (and the display control circuit unit). This is because when the portable rechargeable power supply device of the present invention is used as a power supply of an air-conditioned cloth, the user often keeps the fan operating continuously. Accordingly, the user who knows the continuously operable time of the fan by the full-charged lithium-ion battery does not have to check the battery level during work. Further, the portable rechargeable power supply device of the present invention does not necessarily have the regulator function of the voltage taken out of the lithium-ion battery. This is because the fan is often operated at a constant voltage depending on the work. When the voltage regulator function is not provided, a certain function is still required such as limiting the output current to less than a predetermined level.

INDUSTRIAL APPLICABILITY

As described above, in the portable rechargeable power supply device of the present invention, the dividing section partitions the case into the terminal housing case portion, in which at least the at least one terminal and the first electrically conducting sections are housed, and the main body housing case portion, in which at least the at least one lithium-ion battery, the hazard prevention section and the second electrically conducting sections are housed. Further, the first electrically conducting sections and the second electrically conducting sections are electrically connected to each other via the connecting portion disposed in a predetermined portion of the dividing section. The dividing section prevents leaked water in the terminal housing case portion that has leaked in through the at least one terminal and the surrounding part thereof from further leaking into the main body housing case portion through the predetermined portion of the dividing section. Even when rain water, etc. leaks into the terminal housing case portion through the at least one terminal or the surrounding part thereof, further leakage of the leaked rain water, etc. into the main body housing case portion can be prevented. Accordingly, the hazard prevention section housed in the main body housing case portion can be prevented from being damaged by rain water, etc., and a serious incident due to overcharge and the like can be prevented. Therefore, the present invention can be suitably used as a power supply of air-conditioned cloths and heated cloths that require particularly high safety.

REFERENCE SIGNS LIST 11 battery unit (lithium-ion battery)
111 lithium-ion single cell
12 cable
13 lock terminal
20 assembled circuit board
21 substrate
22a, 22b operation section
23 display section
24 divider portion
25 third connecting pattern
251 first connecting pattern
252 second connecting pattern
26 hazard prevention circuit unit (hazard prevention section)
27 control circuit unit (control section)
28 display control circuit unit (display control section)
29 remaining circuit unit
31a, 31b terminal
40, 40B case
41, 41A, 410a, 410b first case
411 battery housing portion
412 circuit board housing portion
413a, 413b terminal through hole 414, 414a, 414b divider plate (dividing section)
415a, 415b mounting plate
416, 416a, 416b, 416c terminal housing case portion
417, 417a, 417b, 417c main body housing case portion
418 cutout
42, 420a, 420b second case
461 dent
462 hook
47 opening
50 sealing sticker
61, 62 seal member (sealing section)
80 cutout
90 multi-conductor cable with seal
120 leather case
121 belt clip
210 electrode
220a first electrode
220b second electrode
310 opening
320 elastic electrode
330 electrode plate
340 elastic electrode

The invention claimed is:

1. A portable rechargeable power supply device, comprising:
at least one lithium-ion battery;
at least one terminal which is exposed to an outside and receives and supplies electric power from and to the outside;
a hazard prevention section comprising an overcharge prevention section which prevents an overcharge of the at least one lithium-ion battery at least while charging;
a control section which controls electric power taken out of the at least one lithium-ion battery;
a case in which the at least one lithium-ion battery, the at least one terminal, the hazard prevention section, and the control section are housed, the case comprising:
 a terminal housing case portion in which at least the at least one terminal connectable from the outside and first electrically conducting sections of wiring members are housed;
 a main body housing case portion in which at least the at least one lithium-ion battery, the hazard prevention section, and second electrically conducting sections of wiring members are housed; and
 a dividing section which partitions the case into the terminal housing case portion and the main body housing case portion;
an operation section which receives an operation input for the control section;
a display section which displays information on a battery level of the at least one lithium-ion battery; and
a display control section which controls the display section based on a signal from the control section,
wherein the first electrically conducting sections and the second electrically conducting sections are electrically connected to each other via a connecting portion disposed in a predetermined portion of the dividing section, and the dividing section prevents leaked water in the terminal housing case portion which has leaked in through the at least one terminal or a surrounding part of the at least one terminal from further leaking into the main body housing case portion through the predetermined portion of the dividing section,
wherein the control section, the operation section, the display section, and the display control section are housed in the main body housing case portion in addition to the at least one lithium-ion battery and the hazard prevention section, and
wherein an opening for operating the operation section and visually checking the display section is formed at a predetermined portion of the main body housing case portion, and a sealing sticker having a transparent part is provided on the opening.

2. The portable rechargeable power supply device according to claim 1,
wherein the case comprises a first case and a second case which form substantially two respective halves of the case divided in a thickness direction of the case, the first case comprises at least one first divider plate formed therein which serves as the dividing section, the second case comprises at least one second divider plate which is formed therein at a position corresponding to the first divider plate and serves as the dividing section, and the case is configured such that when the first case and the second case are assembled together into the case, the first divider plate and the second divider plate partition the case into the terminal housing case portion and the main body housing case portion, and
wherein the opening is formed at the predetermined portion of the main body housing case portion of the assembled first case and the second case.

3. The portable rechargeable power supply device according to claim 2, further comprising:
an assembled circuit board which is segmented into a first portion, a second portion, and a divider portion as a boundary between the first portion and the second portion,
wherein a first connecting pattern as a part of the first electrically conducting sections is formed in the first portion, the at least one terminal is mounted on the first portion, a second connecting pattern as a part of the second electrically conducting sections is formed in the second portion, the hazard prevention section, the control section, the operation section, the display section, and the display control section are disposed in the second portion, and a third connecting pattern as the connecting portion connecting the first connecting pattern with the second connecting pattern is formed in the divider portion, and
wherein a sealing section which closes a gap around the divider portion is disposed at the divider portion of the assembled circuit board, the first portion and the second portion of the assembled circuit board are housed respectively in the terminal housing case portion and the main body housing case portion, and the assembled circuit board is attached to the first case and the second case such that at least one of the first divider plate and the second divider plate is in pressure contact with the sealing section.

4. The portable rechargeable power supply device according to claim 3, wherein the sealing section comprises a flexible seal member, and the flexible seal member is attached to the divider portion.

5. The portable rechargeable power supply device according to claim 1, wherein the terminal housing case portion is detachable from the main body housing case portion, a top part of the main body housing case portion serves as the dividing section, and the terminal housing case portion is attached to the main body housing case portion such that a bottom part of the terminal housing case portion faces the top part of the main body housing case portion,
wherein first electrodes are disposed in the bottom part of the terminal housing case portion and are connected to ends of the first electrically conducting sections, second electrodes are integrally formed with the top part of the main body housing case portion and are connected to ends of the second electrically conducting sections, the second electrodes serve as the connecting portion, and the first electrodes and the second electrodes are configured such that when the terminal housing case portion is attached to the main body housing case portion, the first electrodes and the second electrodes are in electrical contact with each other, and wherein the hazard prevention section comprises a short-circuit prevention section which breaks an electric current in case of a short-circuit of the second electrodes of the main body housing case portion when the terminal housing case portion is detached from the main body housing case portion.

6. The portable rechargeable power supply device according to claim 5, wherein a circuit board on which the at least one terminal and the control section are disposed is housed in the terminal housing case portion, wherein openings are formed in an bottom part of the terminal housing case portion, wherein one end of each of elastic electrodes which serve as the first electrically conducting sections and the first electrodes is attached to the circuit board, and wherein the other end of each of the elastic electrodes protrudes outward from one of the openings formed in the bottom part of the terminal housing case portion.

7. The portable rechargeable power supply device according to claim 1, wherein the at least one terminal comprises two to four terminals which are arranged with respect to each other in the terminal housing case portion in such a manner that plugs of an external device cannot be inserted in any two of the terminals at the same time.

8. The portable rechargeable power supply device according to claim 1, wherein the at least one terminal comprises an input/output common terminal for charging the at least one lithium-ion battery and supplying electric power from the at least one lithium-ion battery to the outside.

9. The portable rechargeable power supply device according to claim 5, wherein the at least one terminal comprises two to four terminals which are arranged with respect to each other in the terminal housing case portion in such a manner that plugs of an external device cannot be inserted in any two of the terminals at the same time.

10. The portable rechargeable power supply device according to claim 5, wherein the at least one terminal comprises an input/output common terminal for charging the at least one lithium-ion battery and supplying electric power from the at least one lithium-ion battery to the outside.

11. A portable rechargeable power supply device, comprising:

at least one lithium-ion battery;

at least one terminal which is exposed to an outside and receives and supplies electric power from and to the outside;

a hazard prevention section comprising an overcharge prevention section which prevents an overcharge of the at least one lithium-ion battery at least while charging;

a control section which controls electric power taken out of the at least one lithium-ion battery;

a case in which the at least one lithium-ion battery, the at least one terminal, the hazard prevention section, and the control section are housed, the case comprising:

a terminal housing case portion in which at least the at least one terminal connectable from the outside and first electrically conducting sections of wiring members are housed;

a main body housing case portion in which at least the at least one lithium-ion battery, the hazard prevention section, and second electrically conducting sections of wiring members are housed; and a dividing section which partitions the case into the terminal housing case portion and the main body housing case portion;

an operation section which receives an operation input for the control section;

a display section which displays information on a battery level of the at least one lithium-ion battery; and a display control section which controls the display section based on a signal from the control section, wherein the first electrically conducting sections and the second electrically conducting sections are electrically connected to each other via a connecting portion disposed in a predetermined portion of the dividing section, and the dividing section prevents leaked water in the terminal housing case portion which has leaked in through the at least one terminal or a surrounding part of the at least one terminal from further leaking into the main body housing case portion through the predetermined portion of the dividing section, and wherein the case comprises a first case and a second case which form substantially two respective halves of the case divided in a thickness direction of the case, the first case comprises at least one first divider plate formed therein which serves as the dividing section, the second case comprises at least one second divider plate which is formed therein at a position corresponding to the first divider plate and serves as the dividing section, and the case is configured such that when the first case and the second case are assembled together into the case, the first divider plate and the second divider plate partition the case into the terminal housing case portion and the main body housing case portion.

12. The portable rechargeable power supply device according to claim 11, wherein only the at least one lithium-ion battery, the hazard prevention section, and the second electrically conducting sections are housed in the main body housing case portion.

13. The portable rechargeable power supply device according to claim 11, further comprising:

an assembled circuit board which is segmented into a first portion, a second portion, and a divider portion as a boundary between the first portion and the second portion, wherein a first connecting pattern as a part of the first electrically conducting sections is formed in the first portion, the at least one terminal is mounted on the first portion, a second connecting pattern as a part of the second electrically conducting sections is formed in the second portion, the hazard prevention section, the control section, the operation section, the display section, and the display control section are disposed in the second portion, and a third connecting pattern as the connecting portion connecting the first connecting pattern with the second connecting pattern is formed in the divider portion, and wherein a sealing section which closes a gap around the divider portion is disposed at the divider portion of the assembled circuit board, the first portion and the second portion of the assembled circuit board are housed respectively in the terminal housing case portion and the main body housing case portion, and the assembled circuit board is attached to the first case and the second case such that at least one of the first divider plate and the second divider plate is in pressure contact with the sealing section.

14. The portable rechargeable power supply device according to claim 13, wherein the sealing section comprises a flexible seal member, and the flexible seal member is attached to the divider portion.

15. The portable rechargeable power supply device according to claim 11, wherein the at least one terminal comprises two to four terminals which are arranged with respect to each other in the terminal housing case portion in such a manner that plugs of an external device cannot be inserted in any two of the terminals at the same time.

16. The portable rechargeable power supply device according to claim 11, wherein the at least one terminal comprises an input/output common terminal for charging the at least one lithium-ion battery and supplying electric power from the at least one lithium-ion battery to the outside.

* * * * *